United States Patent
Zur-Arie

(10) Patent No.: US 12,495,973 B2
(45) Date of Patent: Dec. 16, 2025

(54) GENERATION OF A TEMPERATURE MAP

(71) Applicant: FRENEL IMAGING LTD, Dorot (IL)

(72) Inventor: Sagi Zur-Arie, Dorot (IL)

(73) Assignee: Frenel Imaging Ltd., Dorot (IL)

( * ) Notice: Subject to any disclaimer, the term of this patent is extended or adjusted under 35 U.S.C. 154(b) by 0 days.

(21) Appl. No.: 18/035,754

(22) PCT Filed: Nov. 1, 2021

(86) PCT No.: PCT/IL2021/051289
§ 371 (c)(1),
(2) Date: May 8, 2023

(87) PCT Pub. No.: WO2022/097133
PCT Pub. Date: May 12, 2022

(65) Prior Publication Data
US 2023/0404409 A1  Dec. 21, 2023

(30) Foreign Application Priority Data
Nov. 9, 2020 (GB) .................................... 2017638

(51) Int. Cl.
*A61B 5/01* (2006.01)
*G06T 15/50* (2011.01)

(52) U.S. Cl.
CPC .............. *A61B 5/015* (2013.01); *G06T 15/50* (2013.01); *G06T 2210/41* (2013.01)

(58) Field of Classification Search
CPC ...... A61B 5/015; G06T 15/50; G06T 2210/41
See application file for complete search history.

(56) References Cited

U.S. PATENT DOCUMENTS 6,075,235 A    6/2000  Chun
7,422,365 B2*  9/2008  Chamberlain ............ G01J 5/10
                                                            374/2
(Continued)

FOREIGN PATENT DOCUMENTS

CN      110944951 A    3/2020
GB        2600926      5/2022

OTHER PUBLICATIONS

Combined Search and Examination Report of priority UKIPO patent application GB2017638.4.
(Continued)

*Primary Examiner* — Dixomara Vargas
(74) *Attorney, Agent, or Firm* — Dr. Hanan Farber Patent Agent Ltd.

(57) ABSTRACT

Generating an accurate and sensitive temperature map over a non-planar surface by capturing a polarimetric thermal image from a non-planar surface. The non-planar surface includes a surface element which emits thermal electromagnetic emission responsive to a temperature of the surface element. Thermal electromagnetic emission is directed to an image element of an image sensor. A polarisation state and intensity are measured of the ray of thermal electromagnetic emission from the surface element. Responsive to the polarization state and the intensity, an angular orientation of the surface element is determined. A temperature of the surface element is determined by estimating the thermal emission normal to the surface element responsive to the angular orientation of the surface element and the intensity of the ray of thermal electromagnetic emission emitting from the surface element.

15 Claims, 2 Drawing Sheets

(56) References Cited

U.S. PATENT DOCUMENTS

| | | | |
|---|---|---|---|
| 9,609,238 B2 * | 3/2017 | Videen | G06T 17/00 |
| 9,829,384 B2 | 11/2017 | Pezzaniti | |
| 10,395,113 B2 | 8/2019 | Aycock et al. | |
| 2016/0232709 A1 * | 8/2016 | Videen | G06T 17/00 |
| 2020/0082159 A1 | 3/2020 | Pezzaniti | |
| 2020/0285838 A1 * | 9/2020 | Hu | G06V 10/76 |
| 2022/0331047 A1 * | 10/2022 | Shelton, IV | G16H 20/40 |

OTHER PUBLICATIONS

Agent letter in response to Combined Search and Examination report UKIPO patent application GB2017638.4.
Three-dimensional facial recognition using passive long-wavelength infrared polarimetric imaging, Yuffa et al. Applied Optics / vol. 53, No. 36 / Dec. 20, 2014.
Enhanced facial recognition for thermal imagery using polarimetric imaging, Gurton, et al., Jul. 1, 2014 / vol. 39, No. 13 / Optics Letters.

* cited by examiner

GENERATION OF A TEMPERATURE MAP

BACKGROUND

1. Technical Field

The present invention relates to generation of a highly accurate and sensitive temperature map on a non-planar surface and particularly for use in medical diagnostics.

2. Description of Related Art

Infrared imaging has been considered for diagnosing peripheral vascular disorders, inflammatory disease, tumours, local metabolic disorders, and body temperature abnormalities. Heat changes, up to a depth of 2-3 centimetre of the skin's surface may be represented with exceptionally good thermal and spatial resolution on the skin, due to the human tissue thermal properties. Infrared imaging has been used for screening of breast cancer, however there is little evidence supporting efficacy for early detection in clinical practice.

Thus, there is a need for and it would be advantageous to have an improved system/method for generating an accurate temperature map of a biological tissue such as for medical diagnostics.

BRIEF SUMMARY

Various methods and systems are disclosed herein for generating a temperature map over a non-planar surface by capturing a polarimetric thermal image from a non-planar surface. The non-planar surface includes a surface element which emits thermal electromagnetic emission responsive to a temperature of the surface element. Thermal electromagnetic emission is directed to an image element of an image sensor. A polarisation state and intensity are measured of a ray of thermal electromagnetic emission from the surface element. Responsive to the polarization state and the intensity, an angular orientation of the surface element is determined. A temperature of the surface element is determined by estimating the thermal emission normal to the surface element responsive to the angular orientation of the surface element and the intensity of the ray of thermal electromagnetic emission emitting from the surface element. Multiple temperatures may be determined respectively for multiple surface elements of the non-planar surface to generate a map of temperatures over the non-planar surface. The non-planar surface may include living biological tissue. A surface contour of the non-planar surface may be presented and the map of temperatures may be superimposed on the surface contour as presented. The map of temperatures is independent of the respective angular orientations of the surface elements.

Prior to determining the temperature of the surface element, a calibration may be performed by measuring thermal electromagnetic radiation emittance or reflectance from a calibration surface as a function of angle and the temperature of the surface element may be determined further responsive to the calibration. The determination of the temperature may include extrapolating from the intensity of thermal emission as measured from the surface element emitting at a non-zero emission angle to an intensity of thermal emission expected at a normal to the surface element.

Various computer readable media store instructions therein for performing various methods disclosed herein.

BRIEF DESCRIPTION OF THE DRAWINGS

The invention is herein described, by way of example only, with reference to the accompanying drawings, wherein.

Figure 1:
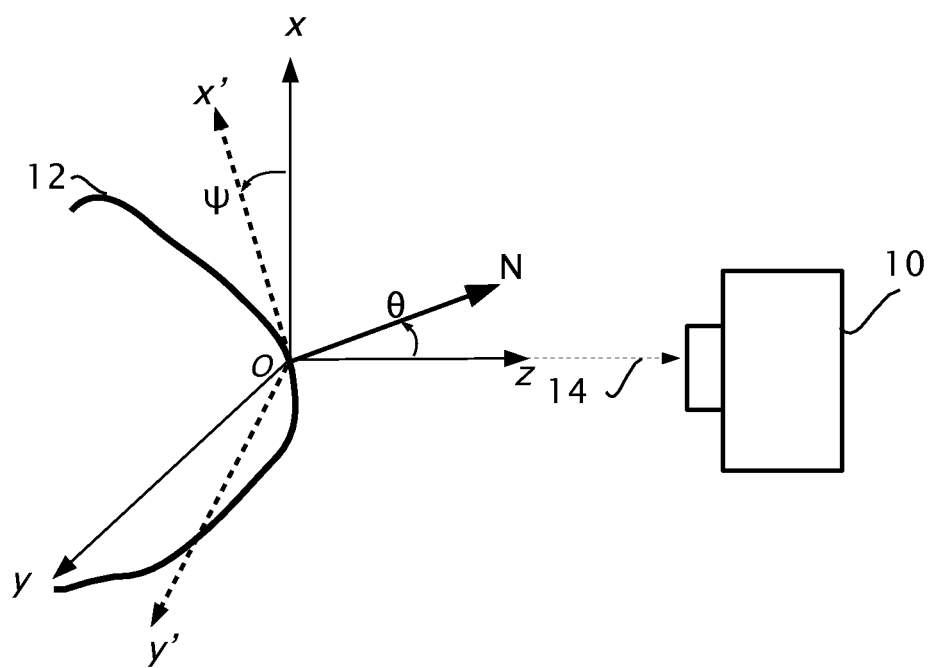
FIG. 1 illustrates a simplified system drawing according to embodiments of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

By way of introduction, aspects of the present invention are directed to use of a thermal camera in order to generate a high resolution and accurate thermal map of biological tissue, e.g. female human breast, in order to screen for breast cancer, by way of example. It is well known that every object at a given temperature emits thermal electromagnetic radiation. In the case of a black body of emissivity $\varepsilon=1$, thermal radiation is modelled by the well known with Planck radiation law. However, for a general object, emissivity is less than one and not necessarily known exactly for all wavelengths of interest. Wavelength of maximum radiation in the temperature range of 30-40 degrees Celsius is in the range of 9.2-9.5 micrometers.

According to Kirchhoff's law of radiation, for an arbitrary body emitting and absorbing thermal radiation in thermodynamic equilibrium, absorptance and emittance are equal and that for a smooth and opaque surface, emittance is directly related to reflectance r, $$\varepsilon(\theta)=1-r(\theta)$$

Moreover, as can be understood from the equations above, emissivity decreases according to emission angle $\theta$, as measured from the surface normal so that a temperature map generated by directly measuring intensity of thermal radiation is sensitive to angle of emittance. In order to conventionally overcome this drawback, it may be recommended to perform multiple thermal scans of the same object from different angles and only consider temperature of surfaces with emission close to the normal. Aspects of the present invention are related to use of polarization information of the emitted thermal radiation in order to account for the angle of emittance and generate a true temperature map.

According to features of the present invention, a thermal bolometric camera appropriate for detecting thermal radiation of wavelength 8-14 micrometer includes an image sensor of vanadium oxide or amorphous silicon which absorbs radiation of wavelength 8-14, and changes electric resistance of the image sensor elements by heating. Image sensors of different materials may become available for use in thermal bolometric cameras.

Commercially available thermal cameras may reach sensitivity and accuracy to sense thermal changes up to 30-40 millidegree Kelvin. A thermal camera suitable for implementing embodiments of the present invention is a division of focal plane imaging polarimeter with 640×512 image elements, i.e. pixels, by way of example: Pyxis™, of Polaris Sensor Technologies, Inc., Huntsville, AL and described in U.S. Pat. No. 9,829,384

The image sensor includes polarizing filters which may include a mosaic of four different polarization direction—0, 90, 45 and −45 degrees. Each pixel measures an intensity with a different polarization, e.g. linear polarization at 0, +45, −45 and 90 degrees. An image may be reconstructed including polarization information from four adjacent pixels at the expense of spatial resolution. According to aspects of the present invention, the polarization information and the measured intensities at various emission angles are used to determine the thermal emission from the surface at zero emission angle, i.e. along the surface normal which may be used to determine a true temperature map of the surface.

Referring now to the drawings, reference is now made to FIG. 1, which is a simplified system drawing according to embodiments of the present invention. A thermal polarimetric camera 10 is shown imaging a surface 12. Surface 12 may be skin of a human female breast, by way of example. A Cartesian xyz coordinate system is shown with origin O at a target point of surface 12. An electromagnetic ray 14 is shown thermally emitted and entering camera 10 for simplicity along the z axis. A normal vector N to the surface at the target point is shown. Two Euler angles may be used to define the orientation of surface 12 at the target point. Target azimuthal angle $\Psi$ is shown as a first rotation about the z axis with x, y axes rotating to x', y' axes as shown until the normal vector N is in the y'z plane. Target pitch angle $\theta$ is shown as a second rotation about the x' axis so that z axis rotates to the z' axis which is now collinear with the normal vector N.

Emitted ray 14 may be directed to and absorbed by an image sensor element (not shown) equipped with polarising filters as described above. Thermal polarimetric camera 10 may be configured to directly output polarization information or polarization information may otherwise be conventionally derived from the output of thermal polarimetric camera 10. Specifically, polarisation information may be in the form of the well known Stokes parameters ($S_0$, $S_1$, $S_2$, DoLP) as follows:

$$S_0 = I_0 + I_{90}, \text{ or } S_0 = \sqrt{I_0^2 + I_{90}^2 + I_{45}^2 + I_{-45}^2}$$

$$S_1 = I_0 - I_{90}$$

$$S_2 = I_{45} - I_{-45}$$

$$DoLP = \frac{\sqrt{S_1 - S_2}}{S_0}$$

where: $I_0$, $I_{90}$, $I_{45}$, $I_{-45}$ are corrected measured intensities at an image element of thermal emission after transmission respectively through polarizing filters at 0, 90 +45 and −45 degrees. DoLP is an acronym for degree of linear polarization.

Polarisation information, e.g. Stoke's parameters may be directly related to the orientation of the surface element of surface 12 being imaged at image element of the image sensor of thermal polarimetric camera 10. Specifically, the target pitch angle $\theta$ is derivable from the third Stoke's parameter DoLP the degree of linear polarisation, as follows:

$$DoLP(\theta) = \frac{\left(1 - |r_\parallel(\theta)|^2\right) - \left(1 - |r_\perp(\theta)|^2\right)}{\left(1 - |r_\parallel(\theta)|^2\right) + \left(1 - |r_\perp(\theta)|^2\right)}$$

where $r_\parallel$ and $r_\perp$ are reflectance values given by the well known Fresnel's equations for reflectance, with n equal to the complex index of refraction.

$$r_\parallel(\theta) = \frac{n^2 \cos\theta - \sqrt{n^2 - \sin^2\theta}}{n^2 \cos\theta + \sqrt{n^2 - \sin^2\theta}}$$

$$r_\perp(\theta) = \frac{\cos\theta - \sqrt{n^2 - \sin^2\theta}}{\cos\theta + \sqrt{n^2 - \sin^2\theta}}$$

Subscript $\parallel$ indicates polarisation parallel to the plane of emittance and the subscript $\perp$ denotes polarisation perpendicular to the plane of emittance. The plane of emittance in FIG. 1 is the plane defined by emitted ray 14 and the normal N to surface 12.

The target azimuthal angle $\Psi$ is derivable from Stokes parameters $S_2$ and $S_1$. Twice target azimuthal angle $2\Psi$ is within an additive constant of:

$\arctan(S_2/S_1)$

Further details with respect to determining orientation of a surface element of surface 12 from Stoke's parameters are previously disclosed in U.S. Pat. No. 9,609,238.

Extrapolating to Zero Angle to Find True Temperature

According to Kirchhoff's law of radiation as shown previously, for an arbitrary body emitting and absorbing thermal radiation in thermodynamic equilibrium, absorptance and emittance are equal and that for a smooth and opaque surface, emittance is directly related to reflectance r for each polarisation, $\varepsilon_\parallel(\theta) = 1 - r_\parallel(\theta)$ $\varepsilon_\perp(\theta) = 1 - r_\perp(\theta)$ Using these relations the emittance at zero angle or surface normal N may be extrapolated from emittance measured at target pitch angle $\theta$.

In other words, thermal intensity at zero degrees (in the direction of the normal N) may be estimated from the measured intensity at target pitch angle $\theta$. The thermal intensity at zero degrees may relate to the true temperature of the surface element.

Effect of Skin Roughness, Non-Uniformity and Colour

It is known that surface roughness may effect the polarization state of thermally emitted radiation. D. L. Jordan and G. D. Lewis, "Measurements of the effect of surface roughness on the polarization state of thermally emitted radiation," *Optics Letter*, pp. 692-4, May 1994.

In this case, Fresnel's law may not strictly apply. Moreover, non-uniformity in complex index of refraction and differences in skin colour may change intensity and polarisation state within surface 12 from person to person. However, these deviations from Fresnel's law if significant may be measured. A measurement of one or more Stoke's parameters, such as emitted intensity and/or DoLP as a function of angle may be used to calibrate the deviations from Fresnel's law as a function of target angle $\theta$ prior to generating a temperature map, according to features of the present invention.

Calibration may alternatively be performed by measuring reflectance as a function of angle in the far infrared wavelength, such as with a 10.6 micron wavelength $CO_2$ laser sufficiently attenuated as to not burn the skin. Kirchhoff's law may then be applied to determine emittance.

Figure 2:
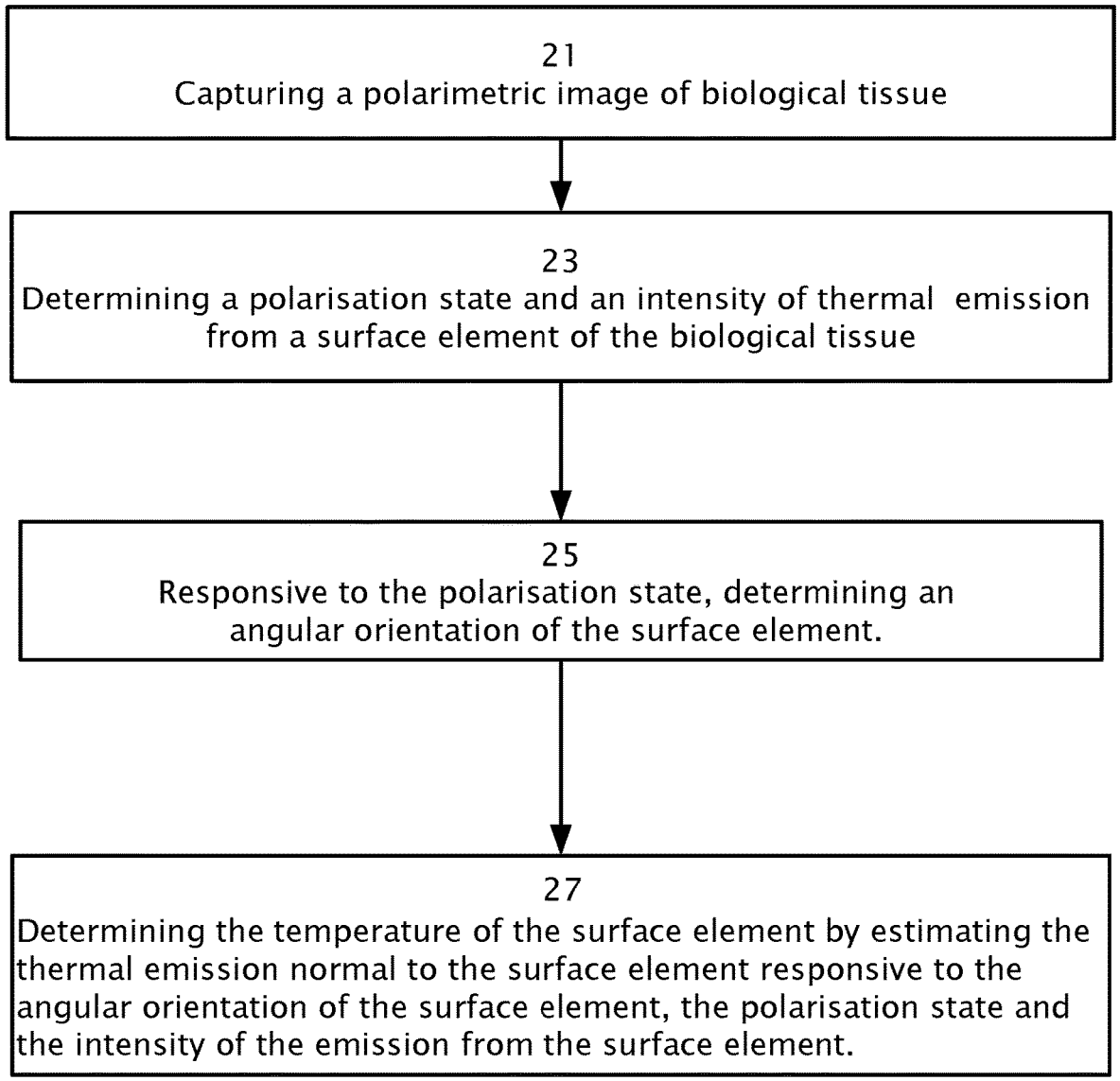
FIG. 2 illustrates a simplified flow diagram, according to features of the present invention.

Reference is now made to FIG. 2, which illustrates a simplified flow diagram 20, according to features of the present invention. A polarimetric image is captured (step 21) from a non-planar surface such as biological tissue, e.g. female human breast. In step 23, a polarisation state and a respective intensity are determined for thermal emission emitted from a surface element. The angular orientation, e.g. normal N to the surface element, is determined (step 25) responsive to the polarisation state and intensity. The temperature of the surface element is determined (step 27), responsive to the angular orientation of the surface element, the measured polarisation state and the measured intensity by estimating the thermal emission normal to the surface element. The temperature map generated is independent of the angular orientations of the surface elements Reflectance Noise It is known that the skin tends to specularly reflect far infrared radiation.

C. Villaseñor-Mora, F. Sánchez-Marin and S. Calixto-Carrera, "An indirect skin emissivity measurement in the infrared thermal range through reflection of a CO2 laser beam," *Revista mexicana de física*, vol. 55(5), pp. 387-392, 1 Oct. 2009

Therefore, reflection of ambient far infrared radiation is a source of reflectance noise.

It can readily be understood from Kirchhoff's law and Fresnel's law of reflection that while reflected light is partially polarised parallel to the plane of incidence, thermal emission is partially polarised perpendicular to the plane of incidence. Thus, capturing of polarimetric images of thermal emissions tends to increase signal from thermal emission relative to noise due to reflectance of background radiation.

Ellipse Fit

As an alternative to the Stoke's vector formulation, the polarisation intensities, for each image element may be fit to a polarisation ellipse such as according to:

Numerically Stable Direct Least Squares Fitting of Ellipses, R Halır, J Flusser, Proc. 6th International Conference in Central Europe, 1998.

The equation used to fit a polarisation ellipse is:

$$AX^2+BXY+CY^2+DX+EY+F=0$$

where A, B, C, D, E and F are parameters to be fit, and (X,Y) are points in the ellipse.

under the constraint that: $B^2-4AC<0$

The centre of the ellipse $(X_0, Y_0)$ is assumed to be at the origin.

Ellipse eccentricity e is given by:

$$e = \frac{c}{a} = \frac{\sqrt{a^2-b^2}}{a} = \sqrt{1-\frac{b^2}{a^2}}$$

$$\text{where } a, b = \sqrt{\frac{2(AE^2+CD^2-BDE+ \sqrt{(B^2-4AC)F)((A \div C) \pm \sqrt{(A-C)^2 \div B^2})}}{B^2-4AC}}$$

where a is given by selecting the + sign and b is given by selecting the − sign.

Target pitch angle may be calculated from the ellipse eccentricity and a previously defined function between target pitch angle and ellipse eccentricity.

Ellipse area which relates to intensity is:

$$A_{ellipse} = \pi ab = \frac{2\pi}{\sqrt{4AC-B^2}}$$

Ellipse azimuth is given by:

$$\theta = \{\arctan\left(\frac{1}{B}(C-A-\sqrt{(A-C)^2+B^2})\right) \text{ for } B \neq 0$$

For each image element or pixel a fit of a polarisation ellipse is performed. The ellipse area represents intensity. Ellipse azimuth and eccentricity are extracted. The ellipse eccentricity is related to target pitch angle. Ellipse azimuth and target pitch angle are used to construct a surface contour in three dimensions.

The ellipse azimuth and the target pitch angle may be converted, as in Stoke's parameters, to Euler angles pitch, yaw with roll=0. A surface contour or mesh may be built from the pitch and yaw Euler angles for multiple surface elements.

A calibration may be performed which determines, e.g. by polynomial regression, a relation between ellipse eccentricity and target pitch angle which may account for specific skin parameters such as colour and roughness and temperature. A thermal emission at the surface element normal and a corresponding temperature may be related to the thermal emission at different target pitch angles for the various skin types.

The term "angle" as used herein is relative to the normal of a surface element.

The term "emission angle" is an angle between a ray of thermal emission and the normal of a surface element.

The term "image element" as used herein refers to a super-pixel of multiple pixels equipped with polarisation filters as earlier described.

The term "independent" referring to a temperature map being independent of the angular orientation of surface elements refers to after surface temperatures have been determined, according to embodiments of the present invention, from the estimation of thermal emission normal to the surface elements.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, transitory and/or non-transitory which is accessible by a general-purpose or special-purpose computer system. By way of example, and not limitation, such computer-readable media can comprise physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

The transitional term "comprising" as used herein is synonymous with "including", and is inclusive or open-ended and does not exclude additional, unrecited elements or method steps. The articles "a", "an" is used herein, such as "a polarisation state" or "a ray" have the meaning of "one or more" that is "one or more polarisation states", "one or more rays".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another. Although selected features of the present invention have been shown and described, it is to be understood the present invention is not limited to the described features.

The invention claimed is:

1. A method comprising:
    capturing a polarimetric thermal image from a non-planar surface, wherein the non-planar surface includes a surface element, wherein the surface element emits thermal electromagnetic emission responsive to a temperature of the surface element, wherein a ray of the thermal electromagnetic emission is directed to an image element of an image sensor;
    (i) measuring a polarization state and an intensity of the ray of thermal electromagnetic emission emitting from the surface element;
    (ii) responsive to the polarization state and the intensity, determining an angular orientation of the surface element;
    (iii) determining a temperature of the surface element by estimating the thermal emission normal to the surface element responsive to the angular orientation of the surface element and the intensity of the ray of thermal electromagnetic emission emitting from the surface element; and
    for a plurality of surface elements of the non-planar surface, performing said (i) measuring, (ii) determining an angular orientation and (iii) determining a temperature, thereby generating a temperature map over the non-planar surface;
    prior to (iii) determining the temperature of the surface element, performing a calibration by measuring thermal electromagnetic radiation emittance or reflectance from a calibration surface as a function of angle; and said (iii) determining the temperature of the surface element further responsive to the calibration.

2. The method of claim 1, wherein the non-planar surface is living biological tissue.

3. The method of claim 1, further comprising:
    presenting a surface contour of the non-planar surface and the map of temperatures superimposed on the presented surface contour.

4. The method of claim 1, wherein the map of temperatures is independent of the respective angular orientations of the surface elements.

5. The method of claim 1, wherein said (iii) determining the temperature includes:
    extrapolating from the intensity of thermal emission as measured from the surface element emitting at a non-zero emission angle to an intensity of thermal emission expected at a normal to the surface element.

6. A system comprising: a polarimetric camera and a processor connectable thereto, the system configured to perform the steps comprising: capturing a polarimetric thermal image from a non-planar surface, wherein the non-planar surface includes a surface element, wherein the surface element emits thermal electromagnetic emission responsive to a temperature of the surface element, wherein a ray of the thermal electromagnetic emission is directed to an image element of an image sensor; for a plurality of surface elements of the non-planar surface:
    (i) measuring a polarization state and an intensity of the ray of thermal electromagnetic emission emitting from the surface element;
    (ii) responsive to the polarization state and the intensity, determining an angular orientation of the surface element;
    (iii) determining a temperature of the surface element by estimating the thermal emission normal to the surface element responsive to the angular orientation of the surface element and the intensity of the ray of thermal electromagnetic emission emitting from the surface element; and from the plurality of temperatures determined respectively for the surface elements of the non-planar surface, generating a map of temperatures over the non-planar surface, prior to determining the temperature of the surface element, calibrating by measuring thermal electromagnetic radiation emittance or reflectance from a calibration surface as a function of angle; and determining the temperature of the surface element further responsive to the calibration.

7. The system of claim 6, wherein the non-planar surface is living biological tissue.

8. The system of claim 6, further comprising:
    a display;
    the system further operable to:
    present on the display a surface contour of the non-planar surface and the map of temperatures superimposed on the presented surface contour.

9. The system of claim 6, wherein the map of temperatures is independent of the respective angular orientations of the surface elements.

10. The system of claim 6, further operable to:
    extrapolate from the intensity of thermal emission as measured from the surface element emitting at a non-zero emission angle to an intensity of thermal emission expected at a normal to the surface element.

11. A non-transitory computer readable medium having software instructions stored thereon comprising: inputting a polarimetric thermal image captured from a non-planar surface, wherein the non-planar surface includes a surface element, wherein the surface element emitted thermal electromagnetic emission responsive to a temperature of the surface element, wherein a ray of the thermal electromagnetic emission is directed to an image element of an image sensor; wherein the polarimetric thermal image includes a polarization state and an intensity of the ray of thermal electromagnetic emission emitted from the surface element; for a plurality of surface elements of the non-planar surface:
    (i) inputting a polarization state and an intensity of the ray of thermal electromagnetic emission emitting from the surface element;
    (ii) responsive to the polarization state and the intensity, determining an angular orientation of the surface element;
    (iii) determining a temperature of the surface element by estimating the thermal emission normal to the surface element responsive to the angular orientation of the surface element and the intensity of the ray of thermal electromagnetic emission emitted from the surface element; and from the plurality of temperatures determined respectively for the surface elements of the non-planar surface, generating a map of temperatures over the non-planar surface; inputting a calibration previously performed by measuring thermal electromagnetic radiation emittance or reflectance from a calibration surface as a function of angle; and determining the temperature of the surface element further responsive to the calibration.

12. The computer readable medium, of claim 11, wherein the non-planar surface is living biological tissue.

13. The computer readable medium of claim 11, having further software instructions stored therein to:
   present a surface contour of the non-planar surface and the map of temperatures superimposed on the presented surface contour.

14. The computer readable medium of claim 11, wherein the map of temperatures is independent of the respective angular orientations of the surface elements.

15. The computer readable medium of claim 11, having further software instructions stored therein to:
   determine said temperature by extrapolating from the intensity of thermal emission as measured from the surface element emitting at a non-zero emission angle to an intensity of thermal emission expected at a normal to the surface element.

\* \* \* \* \*